(12) United States Patent
Vaarala et al.

(10) Patent No.: US 7,346,926 B2
(45) Date of Patent: Mar. 18, 2008

(54) METHOD FOR SENDING MESSAGES OVER SECURE MOBILE COMMUNICATION LINKS

(75) Inventors: Sami Vaarala, Helsinki (FI); Antti Nuopponen, Espoo (FI)

(73) Assignee: Netseal Mobility Technologies NMT Oy, Espoo (FI)

( * ) Notice: Subject to any disclaimer, the term of this patent is extended or adjusted under 35 U.S.C. 154(b) by 226 days.

(21) Appl. No.: 10/500,928

(22) PCT Filed: Jan. 21, 2003

(86) PCT No.: PCT/FI03/00046

§ 371 (c)(1),
(2), (4) Date: Jun. 6, 2005

(87) PCT Pub. No.: WO03/063444

PCT Pub. Date: Jul. 31, 2003

(65) Prior Publication Data

US 2005/0216725 A1    Sep. 29, 2005

(30) Foreign Application Priority Data

Jan. 22, 2002 (FI) .................... 20020113

(51) Int. Cl.
*G06F 15/16* (2006.01)
(52) U.S. Cl. ........................ 726/14; 713/151
(58) Field of Classification Search .......... 726/14; 713/151
See application file for complete search history.

(56) References Cited

U.S. PATENT DOCUMENTS

| | | | |
|---|---|---|---|
| 6,970,459 B1 * | 11/2005 | Meier | 370/389 |
| 7,136,645 B2 * | 11/2006 | Hanson et al. | 455/435.1 |
| 7,171,460 B2 * | 1/2007 | Kalavade et al. | 709/223 |
| 2002/0066036 A1 * | 5/2002 | Makineni et al. | 713/201 |
| 2002/0136226 A1 * | 9/2002 | Christoffel et al. | 370/401 |
| 2002/0191572 A1 * | 12/2002 | Weinstein et al. | 370/338 |
| 2003/0051041 A1 * | 3/2003 | Kalavade et al. | 709/229 |
| 2003/0182431 A1 * | 9/2003 | Sturniolo et al. | 709/227 |
| 2004/0260760 A1 * | 12/2004 | Curnyn | 709/201 |

OTHER PUBLICATIONS

Bask, J. (2001). Pervasive computing: Travel and business services. Telecommunications Software and Multimedia Laboratory. [Online] http://www.tml.hut.fi/Studies/Tik111.590/2001 s/papers/joni-bask.pdf.*

(Continued)

*Primary Examiner*—Nasser Moazzami
*Assistant Examiner*—David Garcia Cervetti
(74) *Attorney, Agent, or Firm*—Rolf Fasth; Fasth Law Offices

(57) ABSTRACT

Messages are sent over secure communication links in networks with a mobile terminal and another terminal. A secure communication link is established between an initial network address of the mobile terminal and the address of the other terminal. When the mobile terminal moves from the initial network address to a new network address, a request message is sent from the mobile terminal to the other terminal to change the secure connection to be used between the new address and the other terminal. The other terminal responds with a reply message with a description about the overcoming methods supported by the other terminal.

20 Claims, 2 Drawing Sheets

OTHER PUBLICATIONS

I.F. Akyildiz, J. McNair, J.S.M. Ho, H. Uzunalioglu, and W. Wang, "Mobility Management in Current and Future Communication Networks," IEEE Network Magazine, pp. 39-49, Aug. 1998. http://citeseer.ist.psu.edu/article/akyildiz98mobility.html.*

Roammate White Paper, Aug. 2000, <http://web.archive.org/web/20000824084641/www.roammate.com/english//roammate/index.html>.*

Roammate White Paper, Feb. 2001, <http://web.archive.org/web/20010204191000/www.roammate.com/english/roammate/index.html>.*

Ulf Gustafson, Jan Forslöw, Network design with Mobile IP, Jun. 2001, INET 2001, <http://www.isoc.org/inet2001/CD_proceedings/T40/inet_T40.htm>.*

Ram Gopal, Senthil Sengodan Niina Karhuluoma, Roland Wolker, On IP Radio Access Network (RAN) Security, Jun. 2001, INET 2001, <http://www.isoc.org/inet2001/CD_proceedings/T80/INET-T80-IPRANSec.htm>.*

Netseal, NetSeal Technologies Plugs Wireless LAN security holes, Aug. 30, 2001, <http://web.archive.org/web/20020109053253/www.globalprmedia.com/internet/netseal.html>.*

Seamless WLAN, WAN Roaming Seeping Slowly In, Dec. 13, 2001, <http://web.archive.org/web/20030804014718/www.80211-planet.com/columns/print.php/939931>.*

Converge Network Digest, Netseal develops IPSec VPN security for 802.11B Network, Aug. 28, 2001, <http://web.archive.org/web/20011129134322/http://www.convergedigest.com/Daily/v8/v8n166.htm>.*

* cited by examiner

METHOD FOR SENDING MESSAGES OVER SECURE MOBILE COMMUNICATION LINKS

PRIOR APPLICATIONS

This is a US national phase patent application that claims priority from PCT/FI03/00046, filed 21 Jan. 2003, that claims priority from Finnish Patent Application No. 20020113, filed 22 Jan. 2002.

TECHNICAL FIELD

The invention is concerned with methods for sending messages over mobile communication links, especially secure mobile communication links.

TECHNICAL BACKGROUND

An internetwork is a collection of individual networks connected with intermediate networking devices and functions as a single large network. Different networks can be interconnected by routers and other networking devices to create an internetwork.

A local area network (LAN) is a data network that covers a relatively small geographic area. It typically connects workstations, personal computers, printers and other devices. A wide area network (WAN) is a data communication network that covers a relatively broad geographic area. Wide area networks (WANs) interconnect LANs across normal telephone lines and, for instance, optical networks; thereby interconnecting geographically disposed users.

There is a need to protect data and resources from disclosure, to guarantee the authenticity of data, and to protect systems from network based attacks.

The IP security protocols (IPSec) provides the capability to secure communications between arbitrary hosts, e.g. across a LAN, across private and public wide area networks (WANs) and across the internet.

IPSec can encrypt and/or authenticate traffic at IP level. Traffic going in to a WAN is typically compressed and encrypted and traffic coming from a WAN is decrypted and decompressed. IPSec is defined by certain documents, which contain rules for the IPSec architecture. The documents that define IPSec, are, for the time being, the Request For Comments (RFC) series of the Internet Engineering Task Force (IETF), in particular, RFCs 2401-2412.

Security association (SA) is a key concept in the authentication and the confidentiality mechanisms for IP. A security association is a one-way relationship between a sender and a receiver that offers security services to the traffic carried on it.

A security association is uniquely identified by parameters of which the first one, the Security Parameters Index (SPI), is a bit string assigned to this SA. The SPI enables the receiving system to select the SA under which a received packet will be processed. IP destination address is the second parameter, which is the address of the destination end point of the SA, which may be an end user system or a network system such as a firewall or a router. The third parameter is the secure protocol being used, i.e., ESP or AH.

The term IPsec connection is used in what follows in place of an IPSec bundle of one or more security associations, or a pair of IPSec bundles—one bundle for each direction—of one or more security associations. This term thus covers both unidirectional and bidirectional traffic protection. There is no implication of symmetry of the directions, i.e., the algorithms and IPSec transforms used for each direction may be different.

Several networks, for instance many corporate and Internet Service Provider (ISP) networks, use so-called private IP addresses. These are addresses internal to the network in question, and which cannot be used in the Internet. The motivation is usually to conserve the use of public IP addresses, the number of which is limited by the IP protocol specification. If a message is sent from such a private network to a computer outside the private network, e.g. to the public Internet, the private sender address needs to be translated into the public IP address space used in the Internet. This translation is referred to as the Network Address Translation (NAT) algorithm. A more comprehensive version of message address translation encompasses not only IP address fields, but also transport protocol fields, such as TCP or UDP ports. This is done because the Transmission Control Protocol, TCP, and the User Datagram Protocol, UDP, are widely deployed transport layer protocols that are generally used with IP, and the TCP and UDP port number translations enable several sessions to be multiplexed to a single public IP address. Such translations are often called Network Address Port Translation (NAPT). The term NAT, in this document, refers to all such translation methods.

Some NAT algorithms support only a subset of existing IP-based protocols. That is, if a protocol that is not supported by a given NAT device is used, the traffic using that protocol will be blocked by the device. The same applies if an ordinary intermediate host, e.g. a router, is configured to block certain types of traffic. In such cases, the message can be encapsulated in another protocol that passes through such intermediate computers. Tunnelling is one method for encapsulating packets of a given protocol into packets of another protocol, in order to overcome such limitations posed by the intermediate computers. The tunnelling is applied at the so-called entry point of the tunnel, while the reverse, i.e. uncovering the original packet, is done at the so-called exit point of the tunnel.

NAT traversal technologies are used to (1) determine whether a NAT device (or several NAT devices) exist in the route between two communicating hosts, and to (2) perform necessary encapsulation to overcome the NAT translations. There might also be other translations, such as protocol translations, performed by a NAT device or another intermediate device. For instance, IPv4 may be translated to IPv6, and vice versa.

When secure messages are desired to be sent from a network requiring NAT translations, the IPSec protocols can be used. There exist several solutions for IPSec NAT traversal. The Internet Engineering Task Force (IETF) is currently in the process of standardising a solution for IPSec NAT traversal.

Even though IPsec provides a strong security solution that already supports traversal through NAT devices, IPsec is static in nature. If either of the hosts sharing an IPSec SA are mobile, i.e. a host moves from one IP network to another, a new security association must be set up each time such movement takes place. This usually involves an IKE protocol execution.

Such an IKE protocol execution involves several round trips in order to set up a new SA for the new network used.

In a known IPSec NAT traversal method, developed in the IETF, the key exchange phase requires the use of IKE main mode, which consists of six messages, followed by IKE quick mode, which consists of three messages, for a total of nine messages. If the IKE aggressive mode, which consists of three messages, is used instead of main mode, a total of six messages are required.

There are several disadvantages of this solution. Firstly, the round trip times may be considerable if there is a considerable routing latency between the new network and the other IPSec endpoint. The latency between two communicating nodes is usually measured in terms of round trip delay (also called round trip latency). A round trip latency is a measure of the time it takes for a packet to be sent from one communicating node to another, and for the other node to send a reply packet back to the sender.

For instance, if the network has a round trip latency of 500 ms, which is not unusual, and IKE main mode is used, the total network latency for an IPSec connection setup is 500×(9/2) ms=2250 ms. This may be unacceptable for some mobile applications. Secondly, the IKE key exchange requires the use of several computationally expensive algorithms, such as the Diffie-Hellman algorithm, and possibly the RSA signature and signature verification algorithms. Such algorithms may require considerable computation for mobile devices, which may be limited in their processing power.

THE OBJECT OF THE INVENTION

The object of the invention is a method for sending messages over mobile communication links, which supports protocol traversal and secure mobile links.

SUMMARY OF THE INVENTION

The method of the invention for sending messages over secure communication links is used in networks comprising at least one mobile terminal and at least one other terminal. There might be intermediate computers between the mobile terminal and the other terminal that perform network address translation and/or other translations. A secure communication link is established between a given initial network address of the mobile terminal and the address of the other terminal. In the method of the invention, the secure communication link defines at least the addresses of the two terminals. Furthermore, the secure communication link supports some method, e.g. an encapsulation method to overcome network address translations and/or other translations. When the mobile terminal moves from an initial network address to a new network address, a request message is sent from the mobile terminal to the other terminal to change the secure connection to be between the new address of the mobile terminal and the other terminal. The request is sent using said method to overcome network translations, e.g. an encapsulation method. The request also contains information to enable the other terminal to detect the existence and nature of translations performed by possible intermediate computer(s). The request also indicates the overcoming methods supported by the mobile terminal. The other terminal responds to the mobile terminal with a reply message with a description about the overcoming methods, such as encapsulations, supported by the other terminal and/or about possible translations made by intermediate computer(s) situated between the other terminal and the new address of the mobile terminal. All messages are thereafter sent from the mobile terminal to the other terminal by using the information sent with said reply.

The term mobile terminal here does not necessarily indicate physical mobility. Rather, the mobile terminal is considered mobile if it changes its method of network access. This does not necessarily require physical mobility.

Some advantageous embodiments are described in the following.

The term registration request (RREQ) is used for the message used by the mobile terminal to request a change in the address of the secure connection. The term registration reply (RREP) is used for the message that the other terminal uses to reply to a registration request. These two messages are preferably similar to the messages of the same name used in the Mobile IP standard, but their precise contents are not essential to the invention.

Essential in the invention is the fact that when a mobile terminal moves to a new address and sends a registration request message (RREQ) to the other terminal, it does not know which protocols or rules are usable in the new communication link. It does not even know if there are any intermediate computers in the new communication link that perform e.g. Network Address Translation (NAT) and/or other translations.

The request message is therefore in a preferable embodiment sent using such encapsulation protocols, that is considered the most general and is supported by as many converting intermediate computers, such as NAT devices, as possible. This means that the registration request message is sent by the mobile terminal e.g. in a way that uses the "best possible" method of traversal available (e.g. UDP or TCP tunnelling as encapsulation method). This increases the chance that the RREQ always reaches the other terminal, regardless of the possibly existing NAT devices in the route between the mobile terminal and the other terminal.

The RREQ includes a description of the message that, generally, indicates the address of the mobile terminal and the encapsulation protocols including parameters used therein. Or the basis of the description, the other terminal can determine whether for example any intermediate devices have modified the (packet) message on route or not.

The exact information included in the description of the message depends on the nature of the intermediate computer(s) and the encapsulation mode, but usually, the information includes the source and destination IP addresses used in the outermost header of the message. Furthermore, transport layer sub-addressing information might be included, such as TCP and UDP ports. Encapsulation methods other than the above example require entirely different encapsulation information. For instance, an encapsulation method based on encapsulating messages inside HyperText Transfer Protocol (HTTP) messages requires entirely different encapsulation information. However, the general idea remains the same.

Thus, the registration request includes information of how the message was encapsulated by the mobile terminal prior to sending. For instance, if UDP encapsulation is used, the request includes typically the following fields:

IP source address

IP destination address

UDP source port

UDP destination port

NAT devices would typically manipulate the IP source address and possibly the UDP source port, but also the destination address and port fields can be manipulated However, the devices would not manipulate the copies of these fields, sent inside the request message, which thus serve as a method for detecting such changes.

After receiving of the request message by said other terminal, the other terminal may determine by examining the request which translations and/or encapsulations have been performed by devices situated between the mobile terminal and the other terminal.

The terminal then sends a registration reply message containing information about the communication link to be used between the new address of the mobile terminal and said other terminal and which is supported by the other terminal. The message may include information about the NAT translations, protocol translations, and other translations detected by the other terminal, and parameters related to such translations. The message may also include an indication of which encapsulation method(s) should be used for communication through the new communication link, and their parameter(s). The reply message is sent using an encapsulation method, preferably using the same encapsulation message as was used for the request message. The encapsulation method(s) used, and their parameters can, in one embodiment, be included in the reply message to enable the mobile terminal to independently detect the translations in the same way as the description of the message earlier was included in the request message.

The other terminal detects the translations performed in the registration request message e.g. by comparing the actual header fields in the message to those fields which, prior to the sending, was included in the message and which are not translated. Examples of fields to be compared are the outer IP header and/or the UDP header, if UDP encapsulation was used. A discrepancy in the fields indicates translation by one or more intermediate computer(s). The nature of the translation, e.g. whether an address or address-and-port translation was performed, can be similarly detected by comparing fields.

When sending its registration reply, the other terminal indicates whether NAT traversal is required, based on the detected discrepancy of fields discussed above. That is, the other terminal determines what encapsulation method should be used.

In said another alternative, in which an encapsulation method(s) is used, wherein the parameters, was included in the reply message to enable the mobile terminal to independently detect the translations, the mobile terminal may itself determine the need for traversal, and choose what encapsulation method is to be used.

If the mobile terminal notices that both its own and the other terminal's views of the exchanged packets are the same, it is an indication on that NAT devices do not exist on the route, and NAT traversal is not necessary. Alternatively, according to the first mentioned embodiment, the other terminal may detect that no translations were performed, and indicate to the mobile terminal that encapsulation is unnecessary.

If there appear to be no NAT devices on the route, the mobile terminal may drop the NAT traversal directly, although in rare situations the connection may still not work without traversal. For instance, packet filtering routers, also known as firewalls, may prevent communication using some protocols while allowing communication with other protocols, while still not doing protocol translation. For this reason, they cannot generally by detected on the basis of packet modifications. Instead, some protocols simply either go through them, or do not go through them. This may cause the registration message(s) to go through the firewall(s), while actual traffic after registration may not go through them.

The mobile terminal should preferably detect this occurrence, and switch back to an encapsulation mode, preferably to the one used for registration and which is already known to go through the intermediate computer(s). Alternatively, the mobile terminal may send a probe packet that is not encapsulated using the method used in the registration, and if the other terminal replies to the probe, it is a strong—but not certain—indication on that un-encapsulated traffic is allowed by the intermediate computer(s). When such a probing protocol is used, data traffic can be sent using this encapsulation method until the results of the probing are known. In case the probing is allowed by the firewall(s) but some particular protocol used in the data traffic is not, the mobile terminal should preferably switch back to the first encapsulation mode.

The secure connection is preferably formed using the IPSec protocol, whereas the messages in the communication are sent using IPSec and possibly a NAT traversal encapsulation, preferably UDP or TCP encapsulation of IPSec packets. In the invention, the secure connection can be updated efficiently to the new network address of the mobile terminal. The messages can be sent without NAT traversal or other changes in the communication link if, on the basis of the comparison made by the mobile terminal, the descriptions of the messages correspond to each other or if it is informed by the other terminal that encapsulation to overcome NAT and/or other translations is unnecessary. Even in that case it might be so that encapsulation is performed anyway to ensure that undetectable translations and/or packet filtering do not prevent traffic from being sent.

The secure communication link that is established between the mobile terminal and the other terminal is, as was already stated by means of the IPSec protocol, is called IPSec connection in this text. Thus, the request sent from the mobile terminal contains information about the new connection to be used.

For forming the IPSec connection, a key exchange mechanism that passes through NAT is used. If the intermediate computer(s) allow the UDP protocol, possibly doing UDP port translation, the IKE key exchange protocol can be used with very minor modifications. Any key exchange protocol can be easily made to go through NAT devices by using a proper encapsulation protocol—or set of protocols—for key exchange message encapsulation. It is also feasible to use several encapsulation mechanisms simultaneously to increase the chance that at least one of them passes through the intermediate computer(s).

In the invention, an application connection can e.g. be established between the mobile terminal and a host connected to the other terminal (in which case the host is referred to as "the other terminal" in the text) or directly between the mobile terminal and the other terminal. The IPsec connection is between the mobile terminal and the other terminal. In the foregoing case, tunnel mode is used in the IPSec communication, whereas in the latter case, transport mode can be used. However, IPSec tunnel and transport mode are interchangeable. IPSec transport mode can be replaced by IPSec tunnel mode, and IPSec tunnel mode can be replaced by IPSec transport mode and possibly a tunnelling protocol, such as the Layer 2 Tunnelling Protocol (L2TP).

In a further embodiment, several request messages can be sent, each processed using a different traversal mechanism (e.g. UDP NAT traversal, TCP NAT traversal, HTTP tunnelling, etc), where after the other terminal indicates in the reply which methods is to be used in the further connection.

The data packets that follow are encapsulated using a traversal mechanism that is either chosen beforehand, or negotiated dynamically in the registration request/registration reply exchange. In that case, NAT traversal is used unconditionally for the registration request/registration reply exchange and the traversal is disabled if it seems that it is unnecessary.

The advantages of the method of the invention are that:

The NAT traversal detection is independent of the keying mechanism (IKE) and that the NAT traversal state, i.e. whether traversal is disabled or enabled, and other associated parameters, is not a static part of the IPSec connection, but can instead be modified using the RREQ/RREP message exchange to suit a new connection point.

The handover, i.e. a connection from one network address to another, requires half a roundtrip for the server-to-client data to start flowing, and one roundtrip for the client-to-server data to start flowing. Compared to standard IPsec, this is a major improvement, enabled by the changeable nature of the modified IPsec SA described in the application, and the registration procedure that detects and reacts to NAT devices in a single round trip.

FIGURES

DETAILED DESCRIPTION

Figure 1:
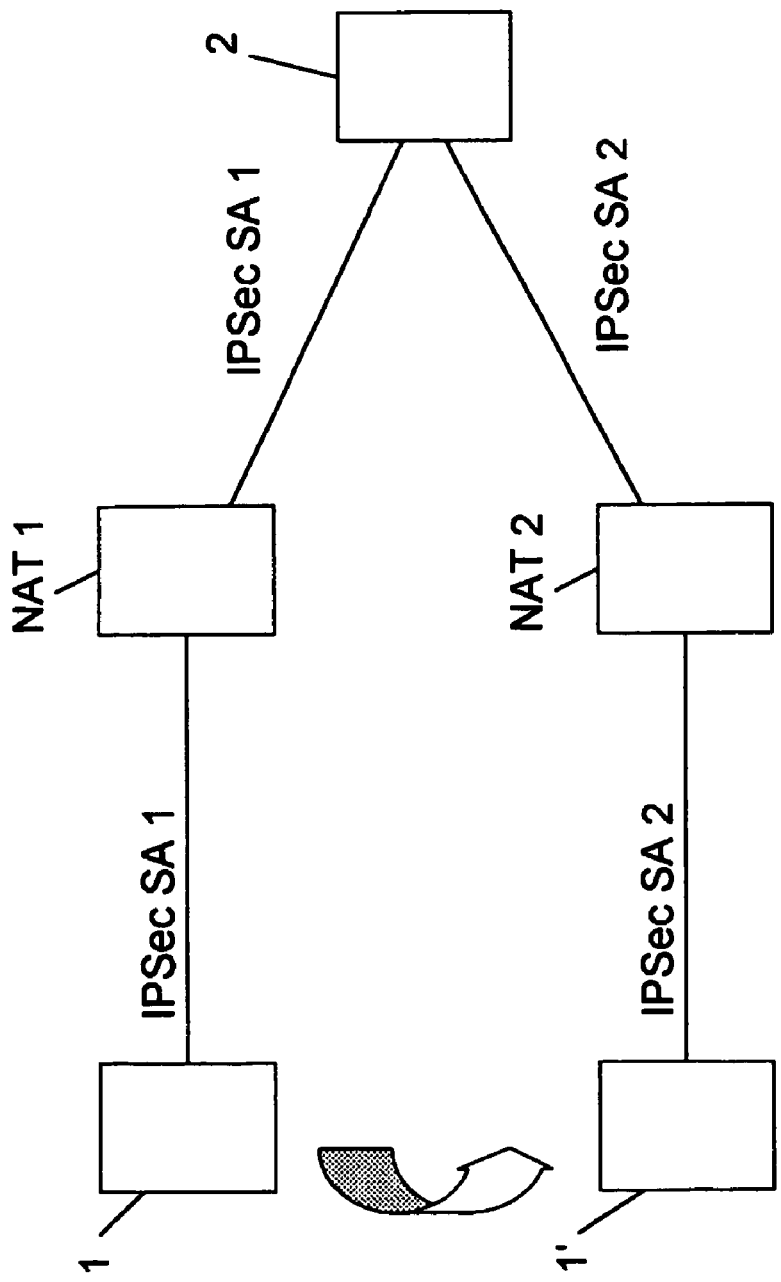
FIG. 1 is an example of a network wherein the method of the invention can be applied.

FIG. 1 describes an example of a network wherein the method of the invention can be applied. Thus, to the network belongs a mobile terminal 1 that has an IPSec SA, here called IPSec SA 1, established between the mobile terminal 1 and another terminal 2, the IPSec SA 1 supporting the translations made by NAT 1. When the mobile terminal 1 moves to another address indicated by the arrow a new IPSec SA 2 has to be established between the terminal 1' the same mobile terminal but marked with 1' as it has moved) and the other terminal 2. The NAT 2 device might support other protocol translations than NAT 1.

In the invention, IPSec SA 2 is established by modifying the existing IPSec SA 1 using a signalling mechanism. In the prior art method, IPSec SA 2 is established either manually or using some automated key exchange protocol, such as IKE, with the disadvantages stated previously.

Figure 2:
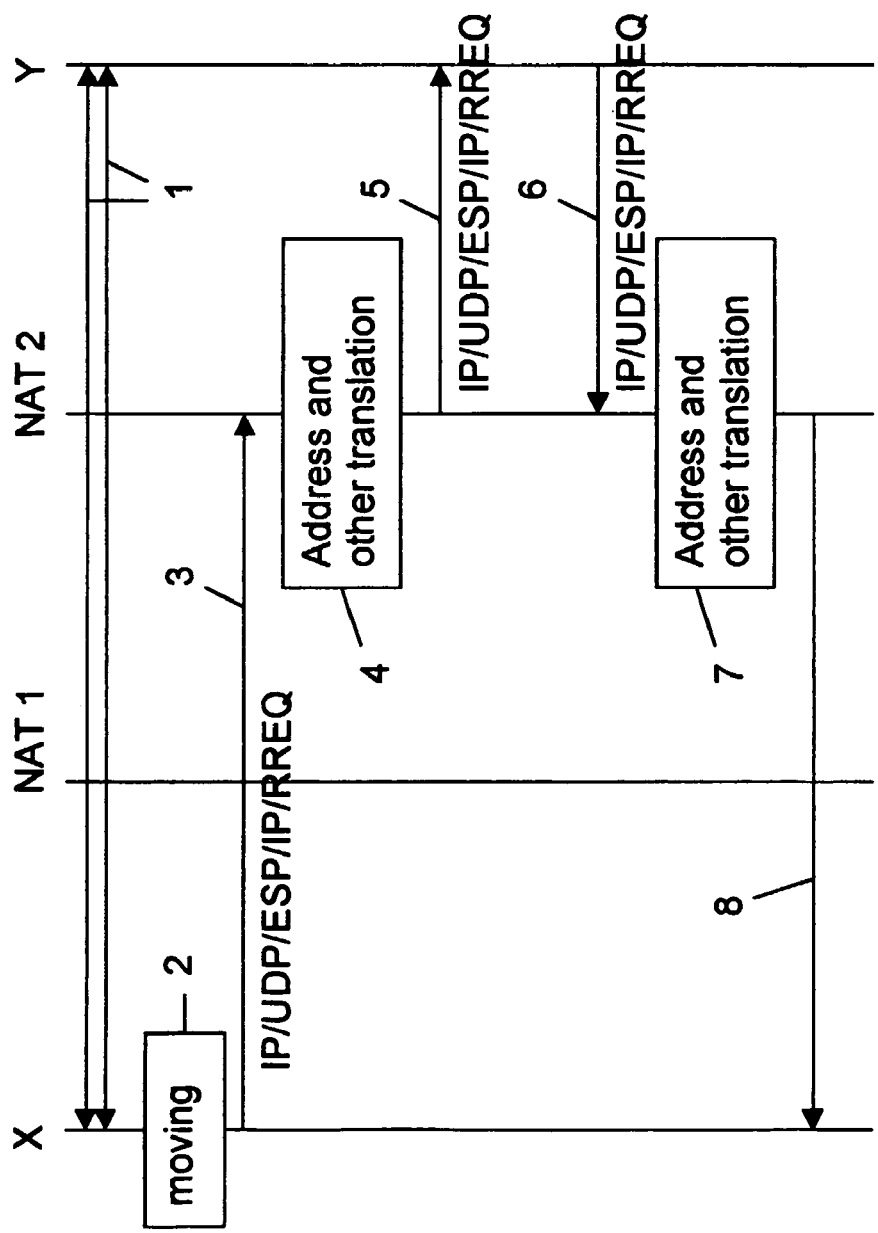
FIG. 2 is a signalling diagram illustrating an embodiment of the method of the invention.

The example of the method of the invention described in FIG. 2 takes place in a network of FIG. 1. The mobile terminal is in FIG. 2 called X and the other terminal is called Y.

In FIG. 2, there is first established an IPSec SA connection between the mobile terminal X and the other terminal Y. The signalling exchange for instance the IKE protocol execution is indicated by reference 1 in FIG. 2. In all communication between X and Y, NAT translations are performed by the NAT1 device and the IPSec connection formed supports NAT traversal to overcome these translations.

When the mobile terminal X moves to another address indicated by step 2 in FIG. 2, it performs a registration request/registration reply exchange with Y to indicate to Y that a new IPSec SA (IPSec SA 2) is to be used for future packets destined to Y and to determine whether traversal is needed or not in the future communication.

It is assumed that X does not know anything about NAT2, not even if such a device exist in the route or not. The request message is indicated in FIG. 2 by the fields IP/UDP/ESP/IP/RREQ indicating that IPSec ESP protection is applied and UDP encapsulation to assert NAT traversal mechanism to overcome possible NAT translations made by NAT 2. This message is sent in step 3 through NAT 2 which makes translations in step 4.

In step 5, the message is forwarded to host Y after translation in NAT 2. In steps 3-8, X establishes IPSec SA 2 by means of the signalling messages. A reply message is sent back from Y in step 6 with information about whether NAT traversal is needed for this connection point. In NAT 2 address and other translation takes place as usual in step 7 and the message after that goes further to the mobile terminal X in step 8.

FIG. 2 uses IPSec ESP tunnel mode as an example, but any other IPSec connections may be used, for instance IPSec in transport mode.

The invention claimed is:

1. A method for sending messages over secure communication links in networks, comprising:
providing at least a first terminal in communication with a second terminal,
establishing a first secure communication link between an initial network address of the first terminal and a network address of the second terminal,
the first terminal performing encapsulation of messages sent in the first secure communication link using a first encapsulation method,
the first terminal moving from the initial network address to a new network address,
the first terminal sending an encapsulated request message, using the first encapsulation method, to the second terminal to change communication between the first terminal and the second terminal from the first secure communication link to a second secure communication link extending between the new network address of the first terminal and the network address of the second terminal, the encapsulated request message containing a description of the first encapsulation method performed by the first terminal,
the second terminal receiving the encapsulated request message,
the second terminal using the description of the first encapsulation method to detect translations of the encapsulated request message performed by intermediate computers disposed en route between the first terminal and the second terminal,
the second terminal responding to the first terminal with a reply message, the reply message having a description about detected translations made by intermediate computers disposed between the new network address of the first terminal and the network address of the second terminal and/or encapsulation methods supported by the second terminal,
the first terminal receiving the reply message and the description about translation made by intermediate computers and encapsulation methods supported by the second terminal, the first terminal selecting an encapsulation method to encapsulate a message based on the description of the reply message, and
the first terminal sending the encapsulated message to the second terminal.

2. The method of claim 1 wherein the method further comprises the second terminal detecting address translations performed by the intermediate computers and including a description to translated source and/or destination addresses in the reply message.

3. The method of claim 1 wherein the description of the reply message has information about encapsulation protocols, as well as source and destination transmission control protocol (TCP) or user datagram protocol (UDP) ports.

4. The method of claim 3 wherein the method further comprises performing network address translation (NAT) traversal by UDP encapsulation or TCP encapsulation.

5. The method of claim 1 wherein the method further comprises the second terminal examining the encapsulated request message to determine which translations and/or encapsulations are required in traffic between the first terminal and the second terminal.

6. The method of claim 5 wherein the reply message contains information about the second secure communication link to be used between the new network address of the first terminal and the second terminal.

7. The method of claim 6 wherein the information about the second secure communication link includes information about whether network address translation (NAT) traversal is used.

8. The method of claim 1, wherein the method further comprises the first terminal comparing the description of the request message with the description of the reply message and sending subsequent messages from the new network address based on the comparison of the descriptions regarding which encapsulations, protocols and rules to use.

9. The method of claim 1 wherein the first secure communication link is formed by using an Internet security protocol IPSec.

10. The method of claim 9 wherein the reply message is sent by using IPSec and a network address translation (NAT) traversal that is updated to the new network address of the first terminal.

11. The method of claim 1 wherein the reply message is sent without a network address translation (NAT) traversal in the first secure communication link when the description of the reply message corresponds to the description of the request message.

12. The method of claim 1 wherein the method further comprises providing a the secure connection with an Internet security protocol (IPSec) security association (SA).

13. The method of claim 12 wherein the method further comprises using a key exchange mechanism that passes through a network address translation (NAT) when forming the IPSec SA.

14. The method of claim 12 wherein a key exchange mechanism is an Internet key exchange (IKE) when a network address translation (NAT) device supports a user datagram protocol (UDP).

15. The method of claim 14 wherein the key exchange mechanism is used when forming the IPSec SA and wherein several traversal mechanisms are used simultaneously to increase a chance that at least one of the traversal mechanisms passes through the NAT device.

16. The method of claim 12 wherein a key exchange mechanism is performed when forming the IPSec SA in which a negotiation process is used to agree on protocols to be used in the further communication.

17. The method of claim 12 wherein an encapsulation protocol is used in a key exchange mechanism when forming the IPSec SA.

18. The method of claim 1 wherein the network address of the second terminal is an end destination address of messages sent from the first terminal and using case transport or tunnel mode in the first and second secure communication links.

19. The method of claim 1 wherein a destination address of the message is a network address of a host which is not the second terminal and using tunnel mode or transport mode together with a tunneling protocol the first and second secure communication links.

20. The method of claim 1 wherein several request messages are sent, each request message being processed using a different traversal mechanism and the second terminal indicating in the reply message which encapsulation method is to be used.

* * * * *